US007813002B2

(12) United States Patent
Schori

(10) Patent No.: US 7,813,002 B2
(45) Date of Patent: Oct. 12, 2010

(54) METHOD OF BACKLIT DISPLAY PRINTING

(75) Inventor: Avi Schori, Kochav Yair (IL)

(73) Assignee: Hewlett-Packard Development Company, L.P., Houston, TX (US)

( * ) Notice: Subject to any disclaimer, the term of this patent is extended or adjusted under 35 U.S.C. 154(b) by 657 days.

(21) Appl. No.: 11/666,129

(22) PCT Filed: Oct. 16, 2005

(86) PCT No.: PCT/IL2005/001088

§ 371 (c)(1),
(2), (4) Date: Sep. 5, 2007

(87) PCT Pub. No.: WO2006/051520

PCT Pub. Date: May 18, 2006

(65) Prior Publication Data

US 2008/0131183 A1 Jun. 5, 2008

(30) Foreign Application Priority Data

Nov. 14, 2004 (IL) ..................................... 165198

(51) Int. Cl.

| | |
|---|---|
| ***H04N 1/23*** | (2006.01) |
| ***H04N 1/387*** | (2006.01) |
| ***H04N 1/40*** | (2006.01) |
| ***H04N 1/50*** | (2006.01) |
| ***H04N 1/56*** | (2006.01) |
| ***G06K 15/02*** | (2006.01) |
| ***G09F 13/04*** | (2006.01) |
| *B41J 2/01* | (2006.01) |

(52) U.S. Cl. ...................... 358/1.9; 358/3.27; 358/502; 358/515; 358/530; 347/2; 347/101; 362/97.1; 40/615; 40/716

(58) Field of Classification Search ................. 358/1.9, 358/3.27, 1.18, 515, 530, 540, 501, 502, 358/296, 300, 302; 347/2, 101; 399/1, 306, 399/309, 364; 400/188; 40/615, 716, 427; 362/97.1, 97.2, 97.3, 97.4
See application file for complete search history.

(56) References Cited

U.S. PATENT DOCUMENTS

| | | | | |
|---|---|---|---|---|
| 2,880,541 | A * | 4/1959 | Kahn | 40/615 |
| 3,997,991 | A * | 12/1976 | Hayman-Chaffey et al. | 40/615 |
| 5,144,328 | A * | 9/1992 | Blake et al. | 347/101 |
| 5,663,023 | A | 9/1997 | Malhotra et al. | |
| 5,741,578 | A * | 4/1998 | Sax | 40/615 |
| 5,992,068 | A * | 11/1999 | de Saro | 40/615 |
| 6,898,883 | B2 * | 5/2005 | Bramer | 40/615 |
| 2003/0051380 | A1 * | 3/2003 | Butler et al. | 40/615 |
| 2004/0177540 | A1 | 9/2004 | Abron | |

FOREIGN PATENT DOCUMENTS

WO WO 01/26081 A 4/2001

* cited by examiner

*Primary Examiner*—Scott A Rogers

(57) ABSTRACT

Disclosed is a method and apparatus for improving the backlit display printed image quality. In accordance with the method, the front side image is printed as an original high quality image. The backside image is printed as a blurred image. Both images are generated from the same digital image data.

13 Claims, 4 Drawing Sheets

METHOD OF BACKLIT DISPLAY PRINTING

TECHNOLOGY FIELD

The present method relates to the field of printing and particularly to inkjet printing.

BACKGROUND

Inkjet printing has gained popularity in a number of printing applications. One of the growing applications is backlit display printing. A backlit display typically includes a thin transparent or light diffusing substrate or media on which an image is printed. During dark time an illumination source illuminates the substrate from its back (backlit). During daytime the sun illuminates the substrate. Backlit displays may be of different shapes such as flat panels, polygonal and round displays, and displays of arbitrary form. Roll-to-roll, drum or flatbed inkjet printers produce backlit displays. Flatbed printers print on rigid substrate. Roll-to-roll and drum printers print on a flexible substrate that is later attached to another transparent or light diffusing rigid substrate.

In order to reach the desired color saturation and density of the backlit display, the same image is printed on both the front side and the backside of the substrate. Another reason for this type of printing is the need to create the same visual appearance when the display is illuminated from the front side or the backside. The registration between the front side image and the backside image should be maintained with high accuracy, usually better than few tens of a millimeter.

Known prior art includes U.S. Pat. Nos. 6,352,332; 6,552,820 and US Patent Application Publication No. 2004/0139403.

BRIEF LIST OF DRAWINGS

The method is particularly pointed out and distinctly claimed in the concluding portion of the specification. The method, however, both as to organization and operation, may best be understood by reference to the following detailed description when read with the accompanied drawings, in which like reference numbers refer to the same parts throughout the different views. The drawings are not necessarily to scale, emphasis instead being placed upon illustrating the principles of the method.

Figure 3:
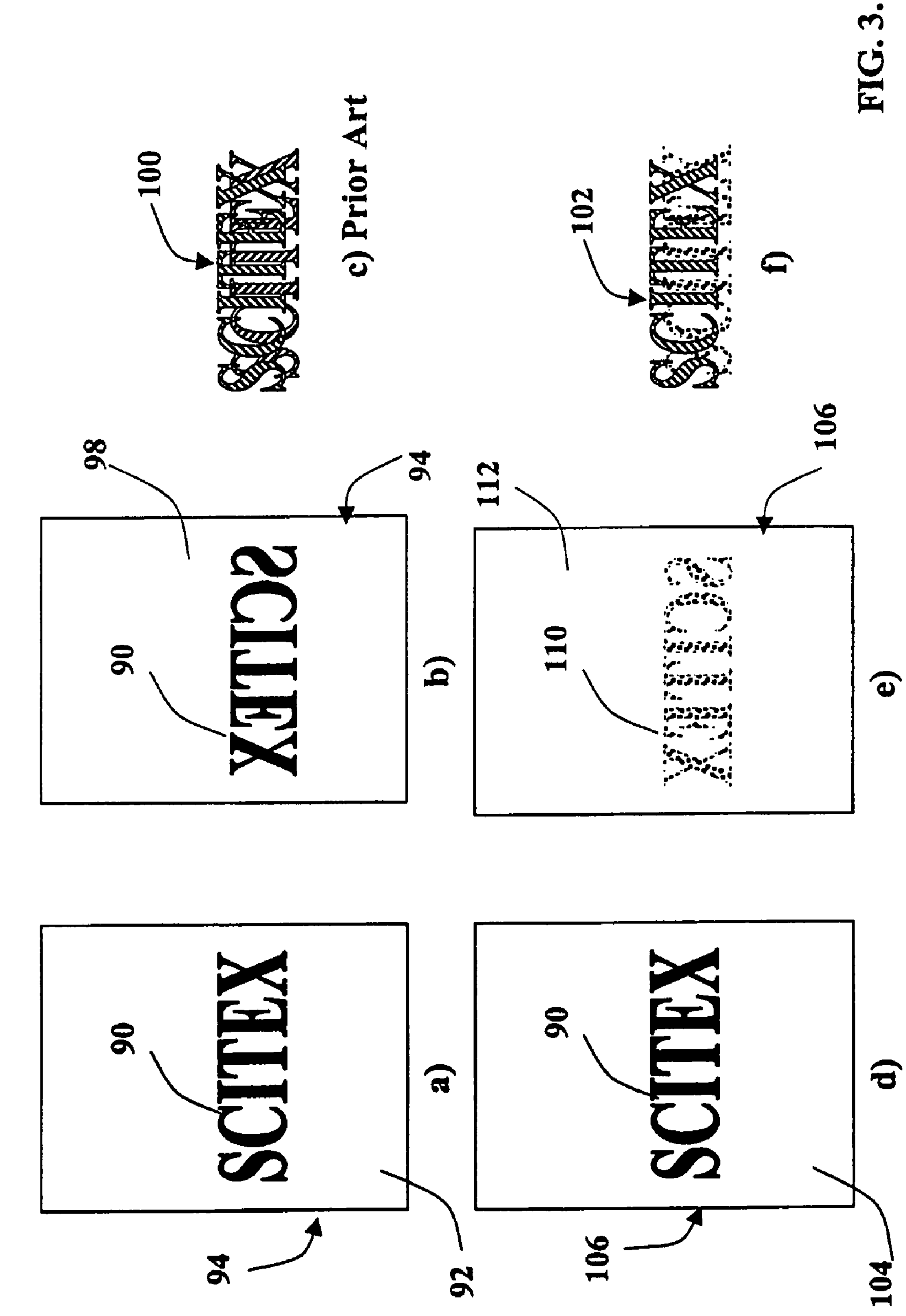
Figure 4:
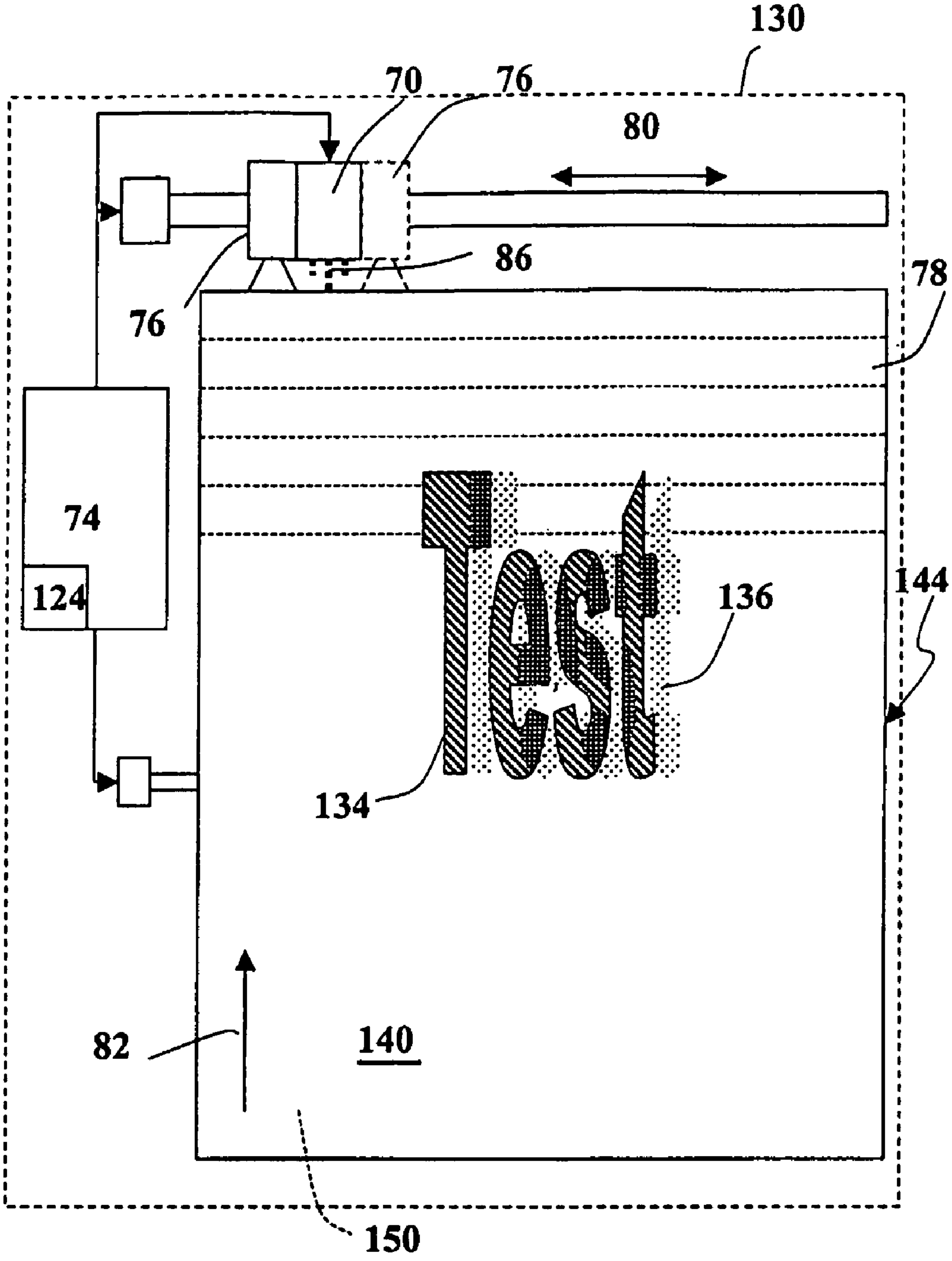

FIGS. 3*a*-3*f* are schematic illustrations of front and back sides of a backlit display and a resulting image printed by conventional backlit display production method and according to the present method, and FIG. 4 is a schematic illustration of an inkjet printing apparatus for backlit display printing.

DETAILED DESCRIPTION OF THE METHOD

The term "front side" means the side of the substrate observed by the viewer. The term "backside" means the side of the substrate that faces the internal illumination source.

"Blurred image" is an image produced by applying a blurring function such as "Gaussian Blur Filter" of PhotoShop software commercially available from Adobe Systems, Inc., San Jose, Calif. U.S.A. to the digital representation of the image. Similar digital "blur" functions are available in some other Graphic Arts design and production software.

For printing color graphics is decomposed into single-color layers. These layers represent the four basic ink colors: cyan, magenta, yellow, and black (C, M, Y, K). Each single-color layer is termed "color separation". Printing with more than four-color separations is known. For example the colors may be cyan and light cyan, magenta and light magenta and so on.

Figure 1:
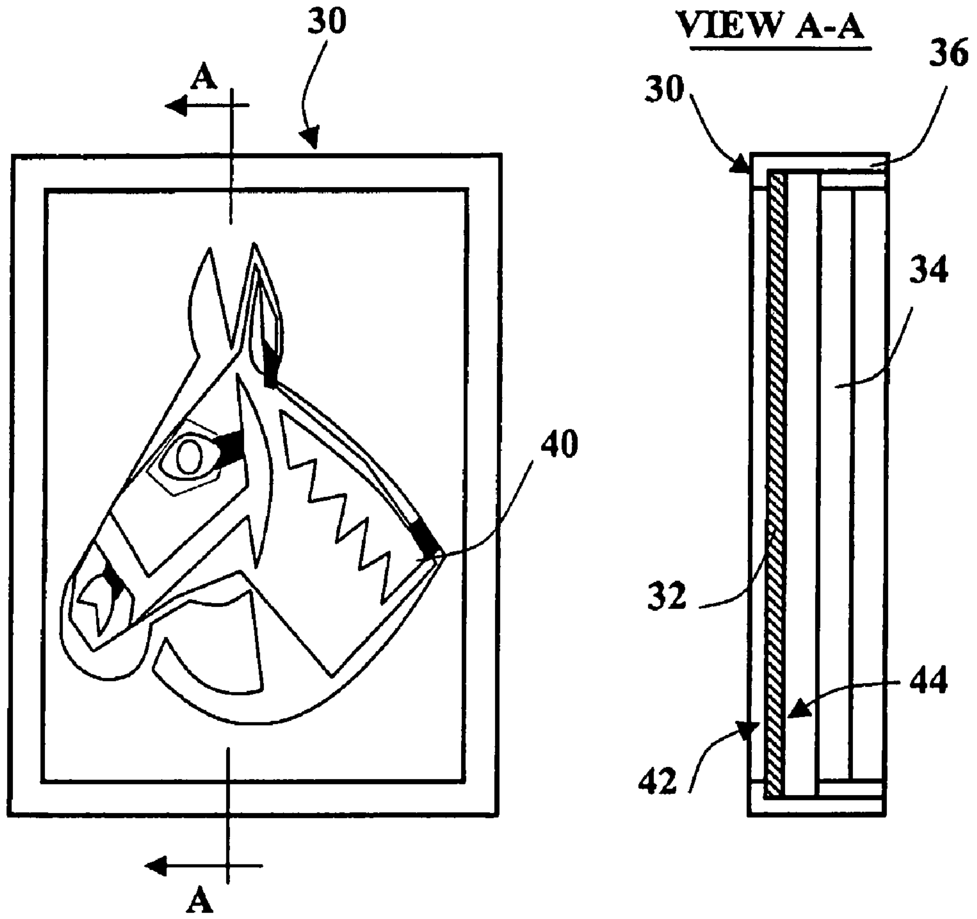
FIG. 1 is a schematic illustration of a backlit display.

Reference is made to FIG. 1, which is schematic illustration of an exemplary embodiment of a backlit display 30. Display 30 may include a substrate 32 and a backlit illumination source 34 such as a luminescent lamp, an incandescent lamp, an assembly of Light Emitting Diodes (LED) or other illumination sources. An enclosure 36 may hold substrate 32 and illumination source 34. An image 40 is printed on front side 42 and a corresponding or matching image is printed on backside 44 of substrate 32 by conventional printing means such as screen-printing, offset printing or digital printing means. Digital printing means may be such as inkjet printer, electro-photographic printer, thermal dye transfer or any other known in the art digital printing means.

Figure 2:
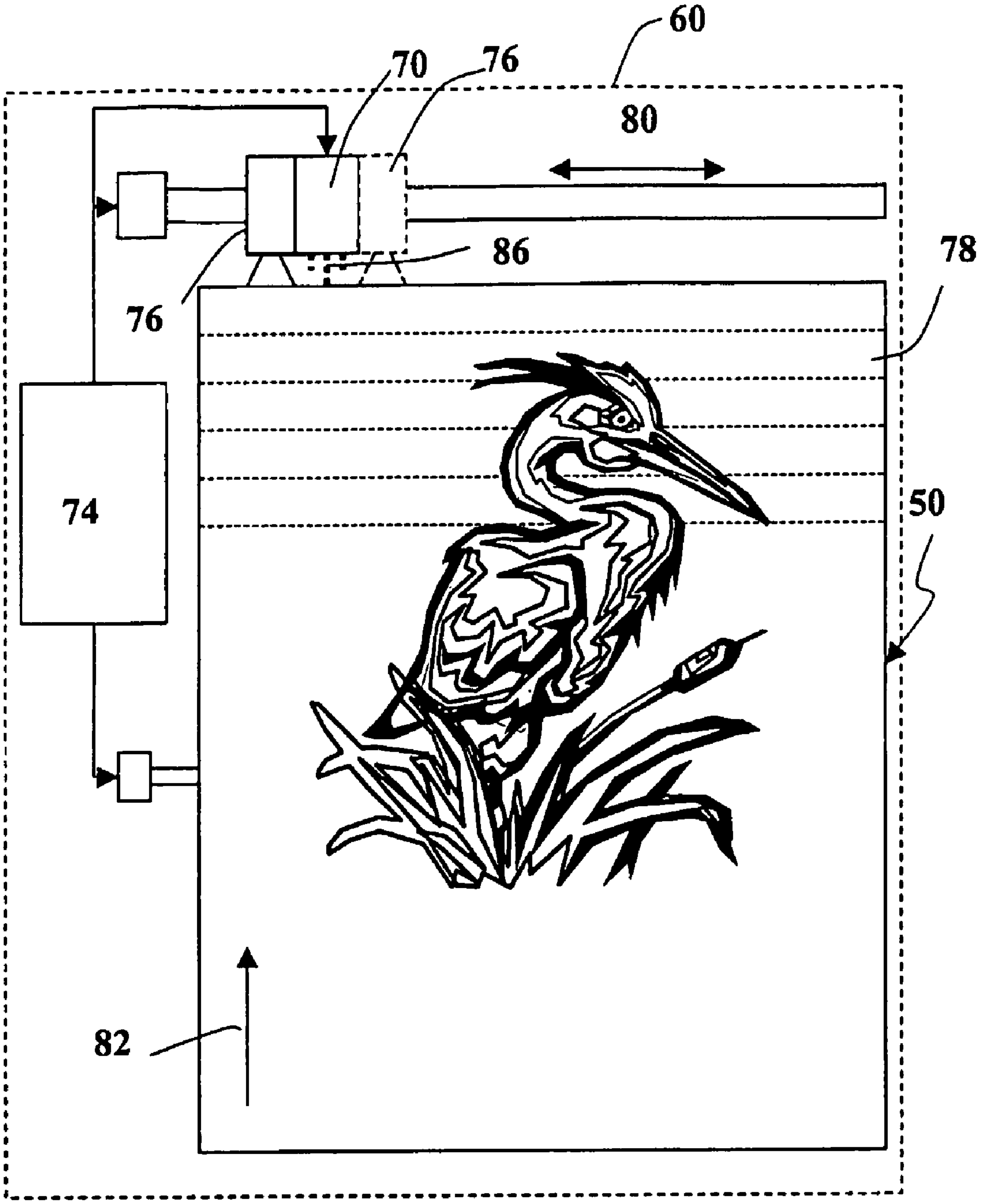
FIG. 2 is a schematic illustration of an inkjet printing apparatus.

The images illustrated in FIG. 1 and FIG. 2 may be printed by a an inkjet printer 60 that in its simplest form (FIG. 2) may include a multi nozzle inkjet print head 70, a controller or a Raster Image Processor (RIP) 74 and a source of ink drying or ink curing radiation 76. Source of ink drying or ink curing radiation 76 may be an IR heater or lamp, or a UV lamp operating in flash or continuous mode. Controller or RIP 74 may be such as Personal Computer (PC) running appropriate software. During printing, print head 70 moves in the direction indicated by arrow 80 and ejects ink droplets 86 to cover according to the image data a print head wide strip 78 on substrate 50. Radiation source 76 may move together with print head 70 and may dry or cure the ink droplets deposited onto substrate 50.

For bidirectional printing as indicated by arrow 80, a second radiation source 76, shown in phantom lines, may be mounted on the other side of print head 70. Controller 74 among others may control the operation of inkjet print head 70, may prepare the information for printing and may synchronize the operation of it with the movement of substrate 50 in the direction indicated by arrow 82.

FIG. 3 is a schematic illustration of front and backside of a backlit display and a resulting image printed by conventional backlit display production method and according to the present method. Original high quality, high resolution image 90 (FIG. 3*a*) is printed on front side 92 of substrate 94 of the backlit display. In a conventional display production method the same original image 90 (Actually, it is a mirrored original image.) is printed on backside 98 (FIG. 3*b*) of substrate 94 of the backlit display. There is always present certain, although minimal miss registration between the front and the backside of the display. FIG. 3*c* illustrates the resulting, prior art image 100, having a certain front-to-back registration error produced by employing the conventional backlit display production method.

According to the present method, original high quality image 90 (FIG. 3*d*) is printed on front side 104 of substrate 106 of a backlit display. Corresponding or matching image 110 (FIG. 3*e*) is printed on backside 112 of substrate 106. Image 110 is a blurred image and may be printed by digital printing or conventional printing methods. The information for printing of both image 110 and image 90 is generated from the same digital data, which resides on a storage facility (not shown) of RIP 74. RIP 74 may be a device on a network and the digital data may reside on a network storage facility. Preparation of the blurred image may take place concurrently with the printing process or as a part of the print preparation sequence. FIG. 3f illustrates the resulting image 102 produced by employing the present backlit display production method.

Images 100 and 102 shown in FIGS. 3c and 3f feature the same degree of front-to-back registration error. Image 102 in FIG. 3f has, however, a sharper and visually more pleasant appearance than image 100 in FIG. 3c.

Color images are usually printed in four or more process colors cyan, magenta, yellow and black. Original high resolution, printed on front side 104, image 90 may include all four-color, or more than four color separations as well, as special colors such as Pantone® colors. Blurred, printed on backside 110, image 110 may include a smaller number of separations and in some cases; printing of one color may be sufficient. The backside image 110 may be printed first. This reduces flexible substrate dimensional distortion caused by the non-uniform ink load.

When the printing is performed by conventional printing methods such as screen or offset printing, the front side separations may be prepared to produce an original high quality image. The backside color separations may be prepared to produce a blurred image.

FIG. 4 illustrates a printer 130 for printing a backlit image display. Printer 130 in addition to regular RIP software includes a feature 124 for processing (blurring) the digital form of the image data. Feature 124 may be a combination of software and hardware. It may process the digital form of the image to be printed and may generate from the same digital image data an original high quality image 134 and a blurred image 136. Printer 130 may print original high quality image 134 on front side 140 of backlit display substrate 144 and blurred image 136 on backside 150 of backlit display substrate 144.

Printing of backlit displays according to the method disclosed reduces the front-to-back registration requirements and improves backlit image display quality and visual appearance. The reduced front-to-back registration requirements save the time spent on the registration and reduce the backlit display production cost.

An exemplary embodiment of the method and apparatus have been described. Nevertheless, it will be understood that various modifications may be made without departing from the spirit and scope of the method. Accordingly, other embodiments are within the scope of the following claims

The invention claimed is:

1. A method of digital printing on both sides of an image bearing substrate, comprising:

printing an image on the front side of said substrate in original high quality format; and printing said image on the back side of said substrate blurred.

2. The method of digital printing of claim 1, wherein said original image and said blurred image are created from the same digital image data.

3. The method of digital printing of claim 1, wherein said image printed on said front side comprises all color separations.

4. The method of digital printing of claim 1, wherein said blurred image comprises at least one color separation.

5. A method of improving backlit image display quality, comprising: printing an image on the front side of said substrate in original high quality format; and printing said image on the back side of said substrate blurred.

6. The method of digital printing of claim 5, wherein said original image and said blurred image are created from the same digital image data.

7. The method of digital printing of claim 5 wherein the image printed on said front side comprises all color separations.

8. The method of digital printing of claim 5 wherein the image printed on said back side comprises at least one color separation.

9. A method of improving front-to-back registration of a backlit image display, comprising:

printing an image on the front side of said substrate in original high quality format; and printing said image on the backside of said substrate blurred.

10. The method of digital printing of claim 9 wherein both images are created from the same digital data.

11. The method of digital printing of claim 9 wherein said image printed on said front side comprises all color separations.

12. The method of digital printing of claim 9 wherein said image printed on said back side comprises at least one color separation.

13. A method of generating color separations for printing backlit display, comprising:

generating original high quality image color separations to be printed on the display front side; and a combination of software and hardware for generating at least one blurred image color separation to be printed on the display backside.

* * * * *